United States Patent
Stauber et al.

(10) Patent No.: US 10,618,417 B2
(45) Date of Patent: Apr. 14, 2020

(54) CHARGING CONNECTION DEVICE FOR A MOTOR VEHICLE AND MOTOR VEHICLE HAVING A CHARGING CONNECTION DEVICE

(71) Applicant: AUDI AG, Ingolstadt (DE)

(72) Inventors: Alois Stauber, Ingolstadt (DE); Martin Schüssler, Kösching (DE); Sebastian Albl, Gaimersheim (DE); Gerhard Harrer, Hilpoltstein (DE); Robert Pietzsch, Berching (DE)

(73) Assignee: AUDI AG, Ingolstadt (DE)

( * ) Notice: Subject to any disclaimer, the term of this patent is extended or adjusted under 35 U.S.C. 154(b) by 306 days.

(21) Appl. No.: 15/501,946

(22) PCT Filed: Jul. 14, 2015

(86) PCT No.: PCT/EP2015/001440
§ 371 (c)(1),
(2) Date: Feb. 6, 2017

(87) PCT Pub. No.: WO2016/020037
PCT Pub. Date: Feb. 11, 2016

(65) Prior Publication Data
US 2017/0253137 A1    Sep. 7, 2017

(30) Foreign Application Priority Data
Aug. 8, 2014   (DE) .................. 10 2014 011 843

(51) Int. Cl.
*H02J 7/00* (2006.01)
*B60L 11/18* (2006.01)
(Continued)

(52) U.S. Cl.
CPC ........... *B60L 11/1818* (2013.01); *B60L 53/14* (2019.02); *B60L 53/16* (2019.02); *B60L 53/18* (2019.02);
(Continued)

(58) Field of Classification Search
CPC . Y02T 90/14; Y02T 10/7005; Y02T 10/7088; Y02T 10/7061; Y02T 10/705;
(Continued)

(56) References Cited

U.S. PATENT DOCUMENTS

| | | | |
|---|---|---|---|
| 2009/0278492 A1* | 11/2009 | Shimizu | B60L 11/1816 320/108 |
| 2013/0249486 A1* | 9/2013 | Eberle | B60L 11/1809 320/109 |
| 2013/0271079 A1* | 10/2013 | Tanneberger | B60L 11/1818 320/109 |

FOREIGN PATENT DOCUMENTS

| | | |
|---|---|---|
| DE | 4212207 A1 | 10/1993 |
| DE | 102009016865 A1 | 10/2010 |

(Continued)

OTHER PUBLICATIONS

Office Action dated Jun. 21, 2018 in corresponding Chinese Application No. 201580042458.6.; 15 pages.
(Continued)

*Primary Examiner* — Binh C Tat
(74) *Attorney, Agent, or Firm* — Maier & Maier, PLLC

(57) ABSTRACT

A charging connection device for a motor vehicle, at least one electromotor designed for driving the motor vehicle, including a charging cable, at its first end with a power supply plug for a household power supply socket and be connected with its second end at least indirectly to a battery of the motor vehicle; a storage compartment, in which the charging cable is received; a charging socket, which can be connected at least indirectly with the battery of the motor
(Continued)

vehicle, and into which can be inserted a charging plug of a charging column; wherein the storage compartment includes the charging socket.

9 Claims, 4 Drawing Sheets

(51) Int. Cl.
*B60L 53/14* (2019.01)
*B60L 53/18* (2019.01)
*B60L 53/16* (2019.01)
*B60R 11/00* (2006.01)
*H01R 13/72* (2006.01)

(52) U.S. Cl.
CPC .............. *B60R 11/00* (2013.01); *H01R 13/72* (2013.01); *B60R 2011/0003* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ............. Y02T 10/7044; Y02T 10/7055; Y02T 10/7077; Y02T 90/12; B60L 2200/36; B60L 2200/26; B60L 58/22; B60L 50/66; B60L 2270/32; B60L 53/53; B60L 2240/72; H02J 7/0054; H02J 7/0055; H02J 9/065; H02J 17/00; H02J 50/40; H02J 7/0042; H02J 7/025; H02J 7/00; H02J 7/0026; H02J 7/0031; H02J 7/0045; H02J 7/0063; H02J 7/0071; H02J 7/042; H02J 7/00036; H02J 7/00041; H02J 7/0068; H02J 9/061; H02J 7/0014; H02J 7/0021; H02J 50/10; H02J 50/70; H02J 5/005; H02J 7/0044; H02J 7/02; H02J 7/32; G01R 31/382; G01R 31/36; G01R 31/3835; H01M 10/4207; H01M 10/482; H01M 10/0525; H01M 10/625; H01M 2/1083; A63H 18/12

USPC .................................................. 320/106–115
See application file for complete search history.

(56) References Cited

FOREIGN PATENT DOCUMENTS

| | | |
|---|---|---|
| DE | 102009016895 A1 | 10/2010 |
| DE | 102010006859 A1 | 8/2011 |
| DE | 102011006630 A1 | 3/2012 |
| DE | 102010048384 A1 | 4/2012 |
| DE | 102010048385 A1 | 4/2012 |
| DE | 102010048386 A1 | 4/2012 |
| DE | 102011007763 A1 | 10/2012 |
| DE | 102011100013 A1 | 10/2012 |
| DE | 102012022101 A1 | 5/2013 |
| DE | 102011121303 A1 | 6/2013 |
| DE | 102011121947 A1 | 6/2013 |
| EP | 0537065 A1 | 4/1993 |
| EP | 2735467 A1 | 5/2014 |
| FR | 2959462 A1 | 11/2011 |
| FR | 2961143 A1 | 12/2011 |
| JP | 2011-160589 A | 8/2011 |

OTHER PUBLICATIONS

German Office Action dated Sep. 2, 2014 of corresponding application No. DE10 2014 011 843.6; 6 pgs.

International Search Report and Opinion dated Oct. 26, 2015 of corresponding application No. PCT/EP2015/001440; 14 pgs.

"All Electric All the Time—The 2014 Chevrolet Spark EV", Published: Jul. 2, 2013, URL:http://sandyblogs.com/techlink/?p=2081, 14 pgs.

"Smart ForTwo Electric Drive review—generation 3", Published: Oct. 10, 2012, URL: http://www.greenmotor.co.uk/2012/10/smart-fortwo-electric-drive-review.html, 6 pgs.

Transmittal of the Translation of the International Preliminary Report on Patentability dated Feb. 9, 2017, in connection with corresponding International Application No. PCT/EP2015/001440, filed Jul. 14, 2015 (7 pgs.).

\* cited by examiner

CHARGING CONNECTION DEVICE FOR A MOTOR VEHICLE AND MOTOR VEHICLE HAVING A CHARGING CONNECTION DEVICE

BACKGROUND

The invention relates to a charging connection device for a motor vehicle and to a motor vehicle having a charging device as specified in the preamble of the independent patent claims.

Electric and plug-in hybrid vehicles offer the possibility to charge a battery of the vehicle from a conventional household power socket found in households with a charging cable. This charging cable usually contains a plug, which is provided with an interface to the household charging socket, but also to a charging column or to another charging device. In addition, such charging cables are usually provided with a control unit having functions related to control and communication that is also referred to as an in-cable device. Moreover, such charging cables are also provided with a charging plug that serves as a vehicle-side interface, which is to say as a charging socket.

Similar charging cables have been so far usually supplied by car manufacturers and accommodated for example in the trunk compartment. If a user wants to charge the battery of the motor vehicle, the user must first remove the corresponding cable from the trunk compartment and connect it to a household socket, and additionally also open a corresponding flap on the motor vehicle in order to connect the charging cable to a corresponding charging socket of the vehicle. After the charging process, the user must again remove the charging cable from the household charging socket, and also remove the charging cable from the vehicle-side charging socket and then stow away the charging cable in the trunk compartment.

A disadvantage is in this case a relatively complicated handling of the charging cable and the time required for this operation. In particular, when other items are stored in the trunk compartment, this makes removal of the charging cable even more complicated. In addition, the space available for storage in the trunk compartment is reduced when a charging cable is accommodated in it. Moreover, there is also the risk that the vehicle could become damaged, in particular by the control device, which is usually referred to as in-cable device and which can bump against the sheet metal or damage the paint of the motor vehicle. Furthermore, undesired contamination of or damage to the control device can also occur during the charging of the battery because it is usually placed on the floor between the vehicle and the household charging socket or a charging column.

That is why it is proposed in documents DE 10 2010 048 385 A1, DE 10 2010 048 386 A1, DE 10 2011 121 303 A1, DE 4 212 207 A1 and DE 10 2009 016 865 A1 that a permanently installed charging cable can be provided on the vehicle side so that the charging cable is equipped with a household charging socket or with a charging station.

Moreover, document DE 10 2010 048 385 A1 proposes to provide a charging socket that can be connected at least indirectly with the battery of the motor vehicle and into which a charging plug or a charging column can be inserted. With the solution proposed here, the user of the motor vehicle can use both the charging cable with a power supply plug for a household charging socket for charging at a household charging socket, as well as a charging plug that can be inserted into a corresponding charging socket provided in a public charging column.

SUMMARY OF THE DISCLOSURE

The objective of the present invention is to provide an improved charging device for a motor vehicle, as well as a motor vehicle having a charging connection device, by means of which a particularly simple and quick handling of the charging cable is enabled during the charging of the battery of a vehicle.

This objective is achieved with a charging connection device and with a motor vehicle provided with a charging connection device having the features of the independent patent claims. Preferred embodiments with convenient, non-trivial further developments of the invention are described in the dependent claims.

The charging connection device for a motor vehicle, which is provided with at least one electric motor designed for driving an electric vehicle, includes a charging cable, which has at its first end a power supply plug for a household charging socket, and which can be connected at its second end at least indirectly to a battery of the motor vehicle. In addition, the charging connection device is provided with a storage compartment in which the charging cable can be accommodated. Furthermore, the charging connection device includes at least one charging socket, which can be connected at least indirectly with the battery of the motor vehicle, and into which can be inserted a charging plug of a charging column. The charging device according to the invention is characterized in that the storage compartment comprises the charging socket and in that the charging cable is provided on its second end with a charging socket plug that can be inserted into the charging socket.

It is therefore provided in accordance with the invention that the charging socket, into which can be inserted a charging plug of a charging column, is not located on the outer skin of the vehicle, such as for example the fender, bumper cover, radiator grille or the like, but instead it is arranged inside the motor vehicle, in particular inside a storage compartment for the charging connection device. The charging cable can be also accommodated in accordance with the invention in the same storage compartment. The charging socket plug of the charging cable can be inserted in advance into the charging socket. It is preferred when the customer can gain access to the storage compartment by means of a flap on the outer skin of the motor vehicle. During a charging operation, the customer can remove the power supply plug for a corresponding household charging socket and a part of the charging cable. A plug-in operation of the charging socket for insertion in the corresponding charging is thus no longer necessary. Preferably, a winding mechanism is provided, such as for example a spring-loaded cable drum or the like, which additionally facilitates the winding up of the charging cable and storing it inside the storage compartment.

A particularly simple and time-saving handling of the charging connection device is made possible with the charging connection device of the invention. Furthermore, damage that can be caused to the vehicle during the insertion of the charging plug into the charging socket is also prevented. Moreover, the space available in the trunk area is not reduced by the charging connection device according to the invention. Thanks to the storage compartment for the charging cable according to the invention, the customer no longer has to rummage through the car looking for the charging socket, as well as for the power supply plug and the charging socket plug. According to an advantageous embodiment of the invention, a control device is arranged between the power supply connector and the charging socket connector, which can be fastened by means of a fastening device arranged in the storage compartment. The control unit is usually a control device that is referred to as an in-cable device, which performs various security and communication functions and thus can continuously monitor a charging process and charging status. Since the control device can be fixed in the storage compartment, this makes it possible to prevent its arrangement outside of the storage compartment during a charging process, which could for example damage the motor vehicle. Furthermore, this also makes it possible to prevent contamination or damage from being caused to the control device, which can occur when the control device is placed on the floor during the charging process.

According to another advantageous embodiment of the invention, the storage compartment is provided with a receiving socket into which the charging socket plug can be inserted. Should the user of the battery of the motor vehicle prefer to charge it at a public charging station instead of at a household charging socket, the user can remove the charging socket plug from the storage compartment in which it is arranged and insert it into the receiving socket instead. In other words, the user can park the charging socket plug in the receiving socket when it is not being used so that the charging socket plug is not arranged loosely inside the storage compartment during the charging process at a public charging station.

According to another advantageous embodiment of the invention, the charging socket can be moved between a first position, in which a socket opening of the charging socket is arranged substantially in the transverse direction of the storage compartment for accepting the charging socket plug, and the second position, in which the socket opening is arranged substantially in the longitudinal direction of the storage compartment. As a result, the design of the charging socket itself is relatively compact so that the dimensions of the storage compartment do not need to be unnecessarily increased in the longitudinal direction. In particular, an overhang of the motor vehicle behind the radiator grille would in this manner be unnecessarily extended. The charging socket can thus be aligned on the side of the storage compartment, which is to say in its transverse direction, and if necessary it can be moved from this position essentially into a position that is aligned in the longitudinal direction of the storage compartment. The adjustable position of the charging socket within the storage compartment enables an optimized alignment of the charging socket depending on the requirements. Should the customer for example desire to charge the battery of the motor vehicle via a charging plug of a public charging column, the charging socket can be oriented forward, which is to say substantially in the longitudinal direction of the storage compartment. On the other hand, if the customers wants to charge the battery by means of the charging cable, the charging socket plug of the charging cable can be left inserted into the charging socket and the charging socket can be arranged substantially in the transverse direction of the storage compartment.

According to another advantageous embodiment of the invention, the charging socket is arranged, in particular by means of a holding device, on a guide rail along which the charging socket can be moved between the first position and the second position. In order to prevent damage to a high voltage cable leading to a charging socket from a charging device that is integrated in a motor vehicle with a suitable bending radius, a corresponding circular guide is used, in particular a circular guide provided for the configuration of the guide rail. A particularly simple adjustment of the charging socket is enabled by means of the guide rail between its both end positions, which is to say between the first and the second position.

According to another advantageous embodiment of the invention, the charging connection device includes an electric servo motor by means of which the socket can be moved between the first and the second position. The positioning of the charging socket can thus be adjusted in a particularly simple manner by the user of the motor vehicle.

According to another advantageous embodiment of the invention, the charging connection device is equipped with an actuating element, in particular an actuating element that is arranged in the storage compartment or in the interior of the motor vehicle, by means of which the electric servo motor can be actuated. The user of the motor vehicle can therefore adjust in a simple and convenient manner the position of the charging socket, for example by means of an actuating element that is designed as a switch. The motor vehicle according to the invention comprises at least one electromotor designed to drive the vehicle, as well as the charging connection device according to the invention, or an advantageous embodiment of the charging connection device according to the invention.

In an advantageous embodiment of the motor vehicle according to the invention, the storage compartment in the motor vehicle is arranged in particular behind the radiator grille, a front bumper, or a rear bumper.

Finally, in a further embodiment of the motor vehicle according to the invention, a flap for opening and closing the storage compartment is arranged in a region of the motor vehicle's outer skin. For example, in the case when the storage compartment is created behind a radiator grille, a part of the radiator grille or the entire radiator grille can be designed as a flap, by means of which the storage compartment can be opened and closed. Depending on the arrangement of the storage compartment, such a flap can be provided for example also at a front or rear bumper of the motor vehicle and thus enable access to the storage compartment and to the charging cable in this manner.

Other advantages, features and details of the invention will become apparent from the following description of preferred embodiments, as well as from attached figures. The features and combination of features mentioned below and in the figures and/or the features and combinations of features shown in the figures can be used not only in the particular indicated combinations, but also in other combinations or alone, without deviating from the scope of the invention.

BRIEF DESCRIPTION OF THE DRAWINGS

Embodiments of the invention will be explained next with reference to schematic drawings, which show.

The same or functionally equivalent elements are provided with the same reference symbols in the figures.

DETAILED DESCRIPTION OF THE DRAWINGS

Figure 1:
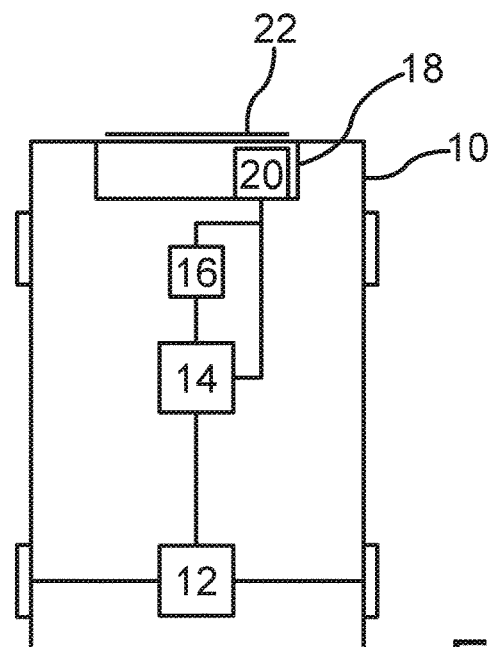
FIG. 1 a schematic representation of an electrically driven motor vehicle, wherein a storage compartment in which is integrated a charging socket is arranged in a front region of the motor vehicle.

FIG. 1 is a schematic representation in which a motor vehicle is indicated by the numeral 10. The motor vehicle 10 comprises an electromotor 12 for driving the vehicle 10. The electromotor 12 is connected to a battery 14, which supplies electric energy for the electromotor 12. The battery 14 is in turn connected to charging device 16, which is integrated on the vehicle side and with which the battery 14 can be charged. In a front region of the motor vehicle 10 is arranged a storage compartment 18 with a charging socket 20 integrated therein. The charging socket 20 is in turn connected through the charging device or also directly with the battery 14 of the motor vehicle. At the storage compartment 18 is in addition arranged a flap 22 by means of which access is enabled to the storage compartment 18. In addition, the storage compartment 18 can be closed 22—as shown here in the figure—by means of the flap 22. In the present case, the storage compartment 18 is arranged behind a radiator grill, not shown in the figure, of the motor vehicle 10. Alternatively, it is also possible for the storage compartment 18 to be arranged for example at a front or at a rear sill of the motor vehicle 10, wherein the flap 22 is then designed and arranged accordingly, which is to say as a part of the relevant outer skin of the motor vehicle 10.

Figure 2:
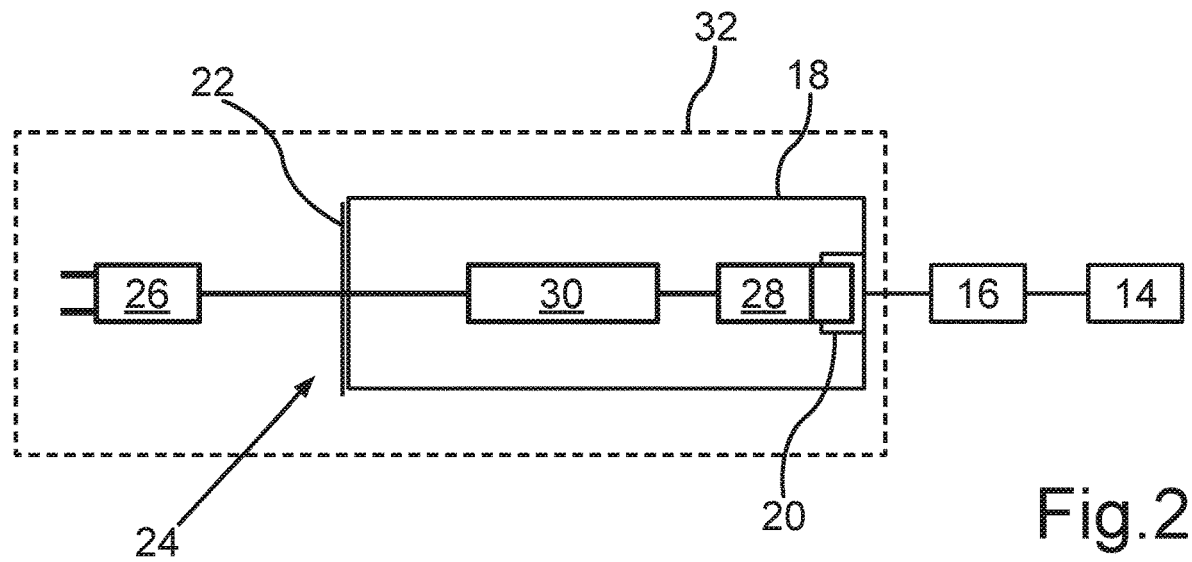
FIG. 2 a schematic representation of a storage compartment, wherein inside the storage compartment is arranged in addition to the already mentioned storage socket also a charging cable for charging a battery of the motor vehicle.

FIG. 2 shows the storage compartment 18, the charging device 16, as well the battery 14, in a schematic illustration. Furthermore, a charging cable 24 is also shown, which is provided at its first end with a power supply plug 26 for a household charging socket, and at its second end with a charging socket plug 28. In the present case, the charging socket plug is inserted in the charging socket 20. Between the power supply plug 26 and the charging socket plug 28 is additionally arranged a control device 30. The control device 30 is in particular a so called in-cable device, which provides various security and communication-related functions during the charging process of the battery 14, so that the charging process and charging status can be continuously monitored. The control device 30 is fastened to the storage compartment 18, and if necessary, it is fastened so that it can be removed.

The storage compartment 18, the charging cable 24 with the power supply plug 26, the control device 20 and the charging socket plug 28 as well as the charging socket 20 and the flap 22 form together a charging connection device 32 for the motor vehicle 10. In the presently shown case, the battery 14 is charged directly via a household power supply socket, not shown here, so that a part of the charging cable 24 is removed along with the power supply plug 26 from an opened storage compartment 18 and the power supply plug 26 is inserted into a customary household socket in order to charge the battery 14. The part of the charging cable 23, on which the control device 30 and the charging socket plug 28 are arranged, can thus remain during the charging process at a customary household socket inside the storage compartment 18, so that the charging socket plug 28 is inserted into the charging socket 20, which is in its turn connected to the charging device 26 and to the battery 14.

FIG. 3 shows again the charging connection device 32 in a schematic representation, wherein in the present case, the battery 14 of the motor vehicle 10 is charged through a public charging column 34 instead of a customary household socket. In the present case, the public charging column 34 is equipped with a corresponding charging plug 36. All that is necessary to charge the battery 14 at the public charging column 34 is to remove the charging socket plug 28 of the charging cable 24 from the charging socket 20 that is integrated in the storage compartment 18. After that, the charging plug 36 of the public charging column 34 is simply inserted into the charging socket 20 so that the battery 14 can be charged by means of the public charging column 34.

Figure 3:
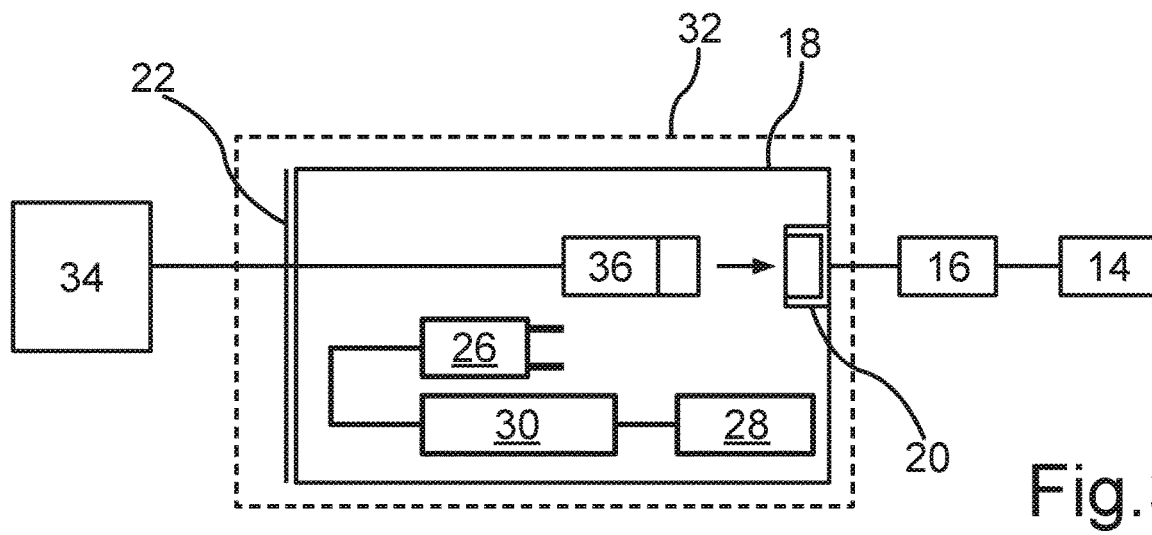
FIG. 3 another schematic view of the storage compartment indicating a state in which the battery of the motor vehicle is charged by means of a public charging socket.
Figure 4:
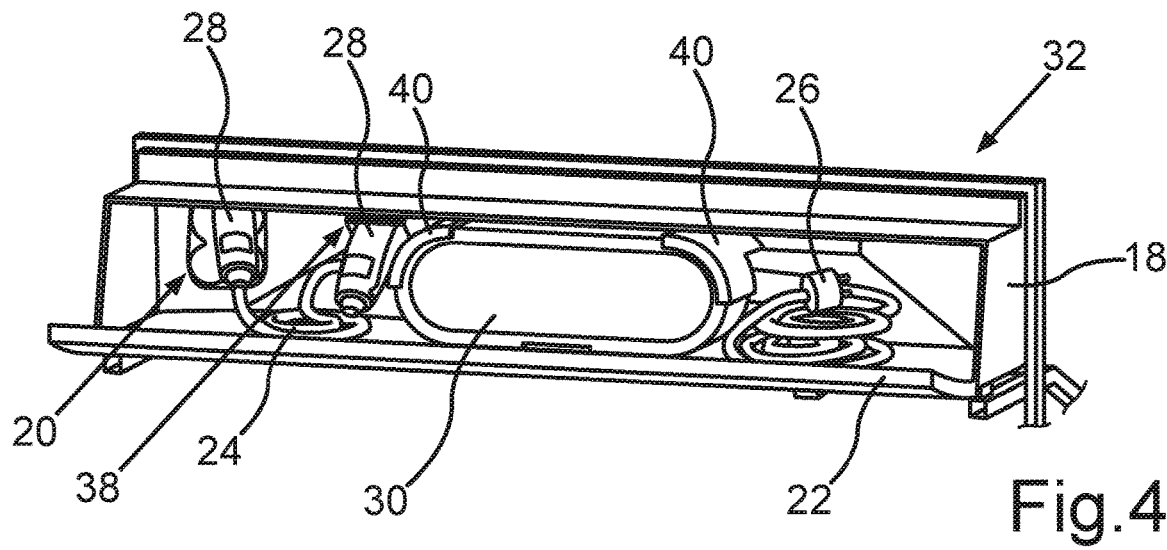
FIG. 4 a perspective front view of the opened storage compartment, in which the charging cable is visible and which is provided at its first end with a power supply plug for a household charging socket and at its second end with a charging socket plug, which is inserted in the charging socket or into a receiving socket.

FIG. 4 shows the charging connection device 32 in a perspective front view. In addition to the already mentioned charging socket 20, a receiving socket 38 is also arranged inside the storage compartment 18, into which the charging socket plug 28 can be inserted. In the present case, the charging socket plug 28 is indicated twice for illustration purposes; as once it is inserted into the charging socket 20, and once into the receiving socket 38. For the case illustrated in FIG. 3, wherein the battery 40 is charged by means of a public charging column that is equipped with its own charging plug 36, the charging socket plug is simply inserted into receiving socket 38, wherein the charging socket plug 28 is placed in the storage compartment 18 so that it is safely accommodated therein. Furthermore, a fastening device 40 can be also seen in the figure, which is arranged inside the storage compartment 18 and by means of which the control device 30 can be releasably fixed again in the storage compartment 18.

Figure 5:
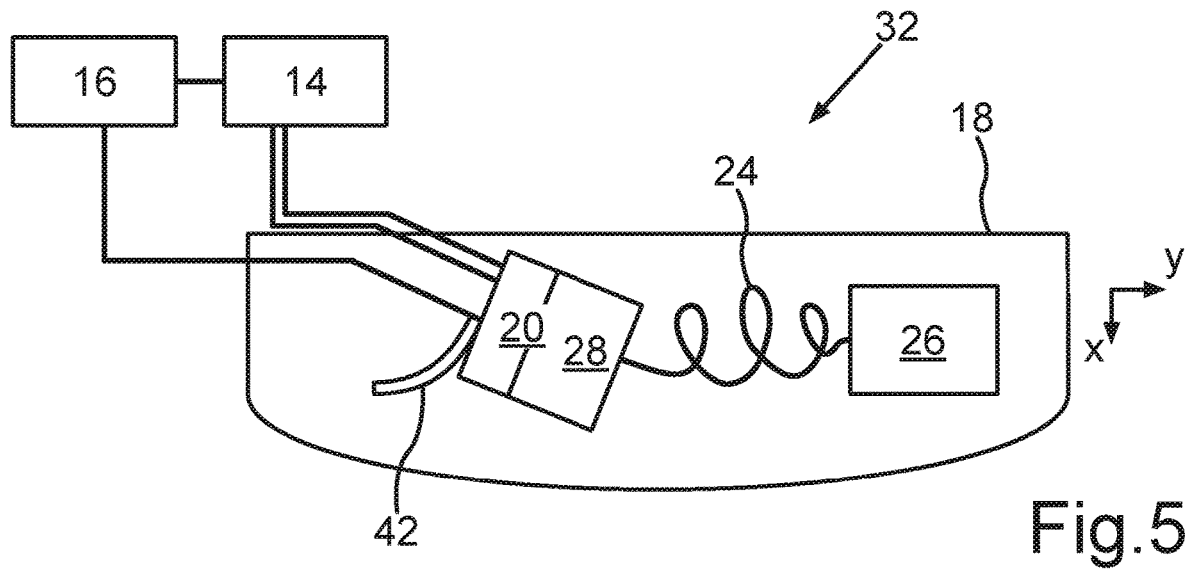
FIG. 5 a schematic top view of the storage compartment, wherein the charging socket is arranged so that it can be adjusted on a guide rail, so that it is lying substantially in the transverse direction of the storage compartment, FIG. 6 another schematic top view of the storage compartment, wherein the adjustable charging socket arranged on the rail is at this point arranged substantially in the longitudinal direction of the storage compartment.

FIG. 5 shows the charging connection device 32 in a schematic top view, wherein x indicates the longitudinal direction of the charging column 18, and y indicates the transverse direction of the charging column 18. The charging socket 20 is arranged on a guide rail 42 by means of a holding device, not shown in the figure, so that the charging socket 20 can be moved along the guide rail 42 between the first position shown in FIG. 5 and the second position shown in FIGS. 6 and 7.

In the first position shown here, a socket opening of the charging socket 20 is arranged to receive the charging plug 36, or to receive the charging socket plug 28 substantially in the transverse direction y of the storage compartment 18. In the present case that is shown in FIG. 5, the battery 14 of the motor vehicle 10 is charged via a charging socket plug 28, not shown here, so that the charging socket plug 28 remains inserted in the charging socket 20 and the power supply plug 26 is inserted into the relevant household power supply socket.

Figure 6:
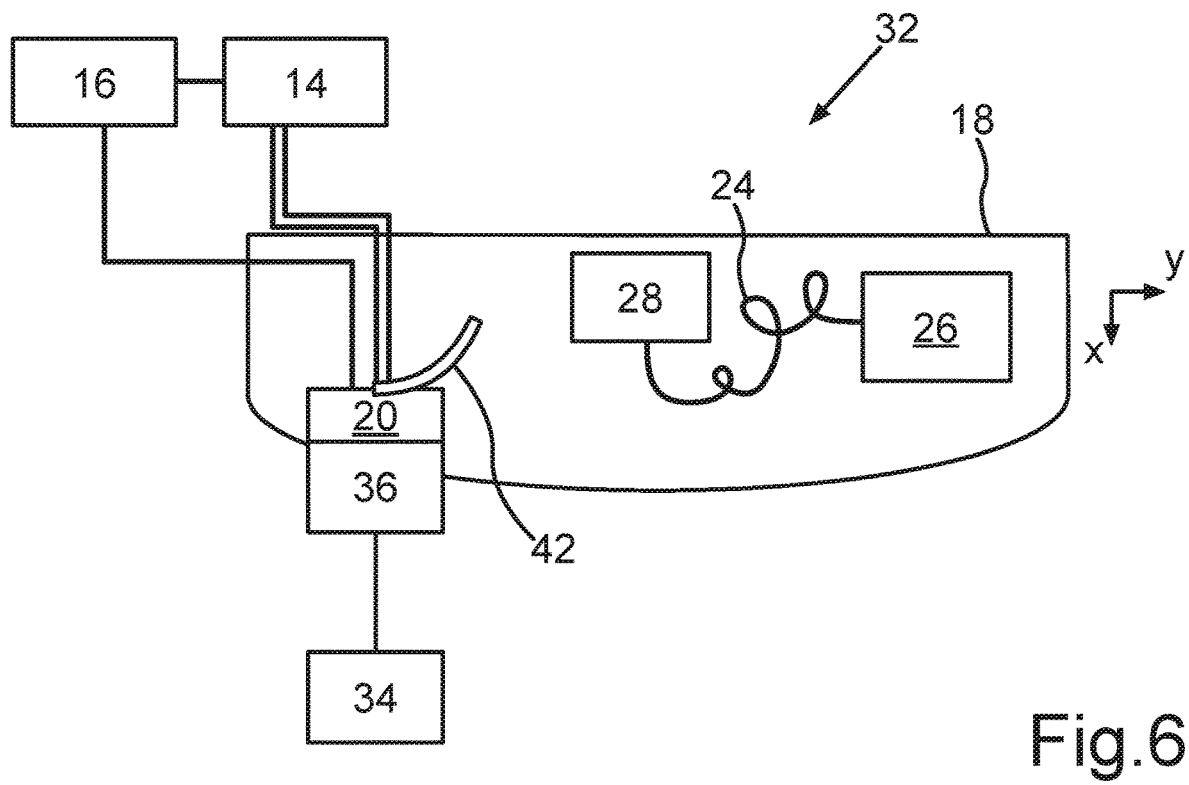
Figure 7:
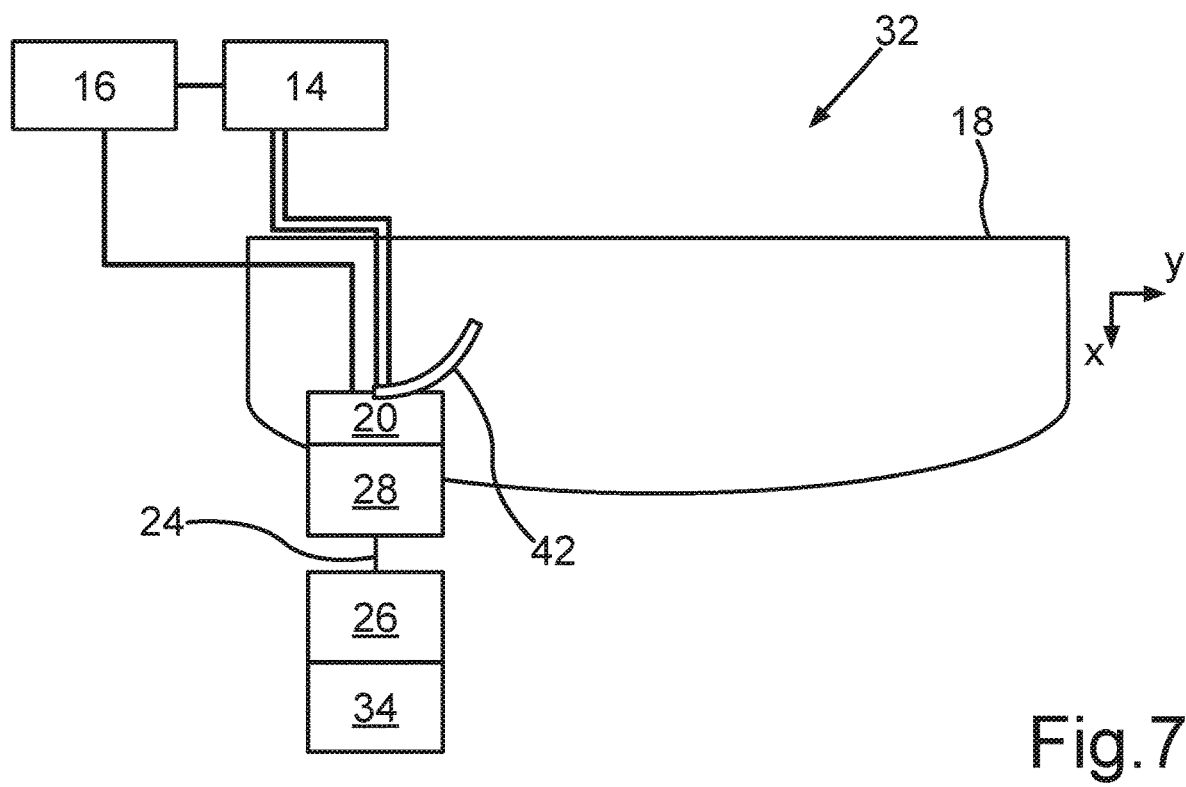
FIG. 7 another schematic top view of the storage compartment, wherein a charging socket that is adjustably arranged on the rail is arranged substantially in the longitudinal direction of the storage compartment.

FIG. 6 shows the charging connection device 32 again in a schematic top view, wherein the figure illustrates the case that was already shown in FIG. 3, namely when the battery 14 of the vehicle 10 is being charged by means of the public charging column 34. Before the charging plug 36 of the public charging column 34 is inserted into the charging socket arranged in the storage compartment 18, the charging socket 20 is moved along the rail 42 from the first position shown in FIG. 5 to the second position shown in FIG. 6, so that the socket opening of the charging socket 20 is substantially oriented in the longitudinal direction x of the charging column 19.

As a result, the accessibility to the charging socket 20 is thus greatly simplified on the one hand, while on the other hand, even if the charging plug 36 of the public charging column 34 has large dimensions, it can be inserted into the charging socket 20, in particular without having an influence on the dimensions in the longitudinal direction x of the storage compartment 18. The charging socket plug 28 can in the case that is shown here again be inserted into the receiving socket 38, not shown in the figure, so that it is safely kept there, since it will not be required during the charging process at the public charging column 34 indicated here.

FIG. 7 shows again the charging connection device 32 in a schematic top view. In the case that was indicated previously, the charging cable 24 itself was used to charge the battery 14 at the public charging station 34. For this reason, the charging socket 20 is moved again in a position that is substantially oriented in the longitudinal direction x of the storage container 18, wherein the charging socket plug 28 is inserted into the charging socket 20 and the power supply plug 26 is inserted into the charging station 34. The condition here is that, naturally, the power supply plug 26 and the charging column 34 must be compatible with respect to their interfaces.

The charging connection 32 is further provided with an electric servo motor, not shown here, by means of which the charging socket 20 can be moved between the first position, in which the charging socket 20 is arranged substantially in the transverse direction y of the storage compartment 18, and the second position, in which the charging socket 20 is arranged substantially in the longitudinal direction of the storage compartment 18. Furthermore, the charging connection device 32 is provided with an actuating element, in particular a switch arranged in the storage compartment 18 or in the interior of the motor vehicle, which is used to operate the electric servo motor in order to adjust the position of the charging socket 20.

The invention claimed is:

1. A charging connection device for a motor vehicle, with at least one electromotor designed for driving the motor vehicle, comprising:
    a charging cable, which is provided at its first end with a power supply plug for a household charging socket, and which is configured to be at least indirectly connected at its second end with a battery of the motor vehicle;
    a storage compartment, in which the charging cable is configured to be accommodated in its entirety;
    a charging socket that is configured to be connected at least indirectly to the battery of the motor vehicle, the charging socket configured to accommodate an inserted charging plug of a charging column;
    wherein the storage compartment further comprises the charging socket;
    and the charging cable is provided at its second end with a charging socket plug, which is configured to be inserted into the charging socket.

2. The charging connection device according to claim 1, wherein a control device is arranged between the power supply plug and the charging socket plug, the control device configured to be fastened in the storage compartment by means of a fastening device arranged in the storage compartment.

3. The charging connection device according to claim 1, wherein the storage compartment has a receiving socket configured to receive the charging socket plug.

4. The charging connection device according to claim 1, wherein the charging socket is adjustable between a first position, in which it is arranged for receiving the charging plug of the charging column and for receiving the charging socket opening designed for the charging socket plug, arranged substantially in a transverse direction (y) of the storage compartment, and a second position, in which the socket opening is arranged substantially in a longitudinal direction (x) of the storage compartment.

5. The charging connection device according to claim 4, wherein the charging socket is arranged by a holding device, on a guide rail, along which the charging socket is movable between the first position and the second position.

6. The charging connection device according to claim 4, wherein the charging connection device has an electric servo motor configured to allow the charging socket to be moved between the first position and the second position.

7. The charging connection device according to claim 6, wherein the charging connection device has an actuating element arranged in the storage compartment or in the interior of the motor vehicle, configured to actuate the electric servo motor.

8. The charging connection device according to claim 6, wherein the storage compartment is arranged in the motor vehicle, behind at least one of a radiator grill, a front bumper, or a rear bumper.

9. The charging connection device according to claim 6, wherein a flap is arranged for opening and closing the storage compartment in a region of the motor vehicle outer skin of the motor vehicle.

* * * * *